(12) United States Patent
Frey et al.

(10) Patent No.: US 11,556,323 B1
(45) Date of Patent: *Jan. 17, 2023

(54) SYSTEMS AND METHODS FOR TRUSTED AND SECURE APPLICATION DEPLOYMENT VIA COLLECTIVE SIGNATURE VERIFICATION OF THE APPLICATION ARTIFACTS

(71) Applicant: CTRL IQ, Inc., Albany, CA (US)

(72) Inventors: John Frey, Sammamish, WA (US); Cedric Clerget, Ormenans (FR); Gregory Kurtzer, Albany, CA (US); Ian Kaneshiro, East Lansing, MI (US); Paul Nathan, Seattle, WA (US); Josh Bacon, Kent, WA (US); Robert Adolph, Huntington Beach, CA (US)

(73) Assignee: CTRL IQ, toc., Albany, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,747

(22) Filed: Apr. 7, 2022

Related U.S. Application Data

(63) Continuation of application No. 17/493,068, filed on Oct. 4, 2021, now Pat. No. 11,321,064.

(51) Int. Cl.
*G06F 9/455* (2018.01)
*G06F 8/60* (2018.01)
(Continued)

(52) U.S. Cl.
CPC ............. *G06F 8/60* (2013.01); *G06F 9/5027* (2013.01); *G06F 21/577* (2013.01);
(Continued)

(58) Field of Classification Search
CPC ........ G06F 8/60; G06F 9/5027; G06F 21/577; G06F 2221/033; H04L 9/3247; H04L 63/101
See application file for complete search history.

(56) References Cited

U.S. PATENT DOCUMENTS

| 5,951,639 A | * 9/1999 | MacInnis ........... H04N 7/17354 348/E7.063 |
|---|---|---|
| 7,124,408 B1 | 10/2006 | Parthasarathy et al. |

(Continued)

*Primary Examiner* — Hang Pan
(74) *Attorney, Agent, or Firm* — Ansari Katiraei LLP; Arman Katiraei; Sadiq Ansari

(57) ABSTRACT

Disclosed are systems and methods for trusted and secure application deployment via collective signature verification of the application artifacts. The trusted and secure application deployment may include receiving multiple application artifacts, decoding verifications from at least one cryptographic signature associated with each received artifact, comparing the verifications to a first set of requirements specified in an admission control list, comparing the verifications from a first received artifact to a second set of requirements specified in the verifications of a second received artifact, halting the deployment of the artifacts in response to the decoded verifications not satisfying one or more requirements from the first set of requirements or the second set of requirements, and deploying the artifacts to a set of compute nodes in response to the verifications decoded from the received artifacts satisfying the first set of requirements and the second set of requirements.

19 Claims, 8 Drawing Sheets

(51) Int. Cl.
*G06F 21/57* (2013.01)
*G06F 9/50* (2006.01)
*H04L 9/40* (2022.01)
*H04L 9/32* (2006.01)

(52) U.S. Cl.
CPC .......... *H04L 9/3247* (2013.01); *H04L 63/101* (2013.01); *G06F 2221/033* (2013.01)

(56) References Cited

U.S. PATENT DOCUMENTS

| | | |
|---|---|---|
| 2004/0054946 A1 | 3/2004 | Atallah et al. |
| 2008/0072219 A1* | 3/2008 | Kabadiyski ............... G06F 8/60 717/175 |
| 2008/0320460 A1* | 12/2008 | Miller ................. G06F 9/44536 717/162 |
| 2009/0113442 A1 | 4/2009 | Deidda et al. |
| 2009/0307471 A1* | 12/2009 | Khandual ............. G06F 11/366 712/E9.035 |
| 2011/0307899 A1 | 12/2011 | Lee et al. |
| 2012/0084769 A1* | 4/2012 | Adi .......................... G06F 8/63 717/174 |
| 2012/0260245 A1 | 10/2012 | Berg et al. |
| 2013/0073864 A1* | 3/2013 | Sarkar ..................... G06F 21/64 713/189 |
| 2013/0198755 A1 | 8/2013 | Kim et al. |
| 2014/0130036 A1 | 5/2014 | Gurikar et al. |
| 2014/0289733 A1 | 9/2014 | Fritz et al. |
| 2016/0306673 A1 | 10/2016 | You |
| 2017/0078409 A1 | 3/2017 | Yazir et al. |
| 2020/0026580 A1 | 1/2020 | Bahramshahry et al. |
| 2020/0371782 A1* | 11/2020 | Baierlein ............ H04L 63/0807 |

* cited by examiner

SYSTEMS AND METHODS FOR TRUSTED AND SECURE APPLICATION DEPLOYMENT VIA COLLECTIVE SIGNATURE VERIFICATION OF THE APPLICATION ARTIFACTS

CLAIM OF BENEFIT TO RELATED APPLICATIONS

This application is a continuation of U.S. nonprovisional application Ser. No. 17/493,068 entitled "Systems and Methods for Trusted and Secure Application Deployment Via Collective Signature Verification of the Application Artifacts", filed Oct. 21, 2022. The contents of application Ser. No. 17/493,068 are hereby incorporated by reference

BACKGROUND

Applications may be constructed from different containers, container images, Helm charts, configuration files, executables, and/or other artifacts. Some of the application artifacts may be generated by the application developer and other application artifacts may include shared or reusable artifacts that are sourced from GitHub® and/or other software development platforms or repositories. For instance, a first container, that is created by a first developer and that performs a first process or service, may be combined with a second container, that is created by a second developer and that performs a second process or service, in order to create an application that produce unique output based on the combined execution of the first and second processes or services.

Problems may arise when the first developer adds to, updates, or otherwise changes the first container in a manner that breaks compatibility with the second container and/or other processes or services of the application. Similarly, problems may arise when another developer or the first developer releases a container that resembles the first container but that is incompatible with the second container. In many cases, the application developer may also have no means of verifying that the artifacts that are shared by others do what they claim to do, do not contain malicious code, are not vulnerable to attacks, and/or are otherwise trustworthy.

DETAILED DESCRIPTION OF PREFERRED EMBODIMENTS

The following detailed description refers to the accompanying drawings. The same reference numbers in different drawings may identify the same or similar elements.

Disclosed are systems and methods for trusted and secure application deployment via collective signature verification of the application artifacts. The trusted and secure application deployment may involve using cryptographic signatures of the artifacts to verify the collective set of artifacts making up the application against requirements that may be set for the application developer, the application being deployed, the individual artifacts, the compute nodes that are available to run the application, and/or other verifications required for deployment of a trusted and secure application.

In some embodiments, the signature verification may be used to confirm that all or a specific set of application artifacts originate from one or more trusted sources prior to deploying the application artifacts to run on one or more compute nodes. In some embodiments, the signature verification may be used to evidence one or more verifications for the application artifacts and/or that the application artifacts satisfy dependencies that are defined for the application being deployed, the individual artifacts, the compute nodes that are available to run the application, and/or a trusted and secure application. For instance, the signature verification may be used to confirm that the application artifacts match the artifact versioning specified for the application, are compatible with other artifacts of the same application, have passed certain tests, do not contain vulnerabilities as a result of having passed various security scans, produce a desired-level of performance, are verified to run on specific environments or hardware resources, and/or have received other verifications defined for a trusted and secure application.

Artifacts with signatures that do not contain one or more of the required verifications and/or are otherwise determined to be untrustworthy or unsecure based on the signatures or lack of a signature may be prevented from deployment or execution as part of the application. In some embodiments, unverified artifacts may be automatically substituted with artifacts that contain the proper cryptographic signatures for the required verifications.

The systems and methods may include a Signed Artifact Registry ("SAR") for the verification, cryptographic signing, storage, and/or distribution of artifacts with associated signatures, and an Artifact Admission Controller ("AAC") for the trusted and secure deployment of an application based on enforcement and verification of the application artifact signatures. In some embodiments, SAR and AAC may represent different devices and/or systems that are remotely accessible via one or more data networks. In some embodiments, SAR and AAC may be combined and/or integrated as part of a single system that runs from a shared set of hardware resources.

Figure 1:
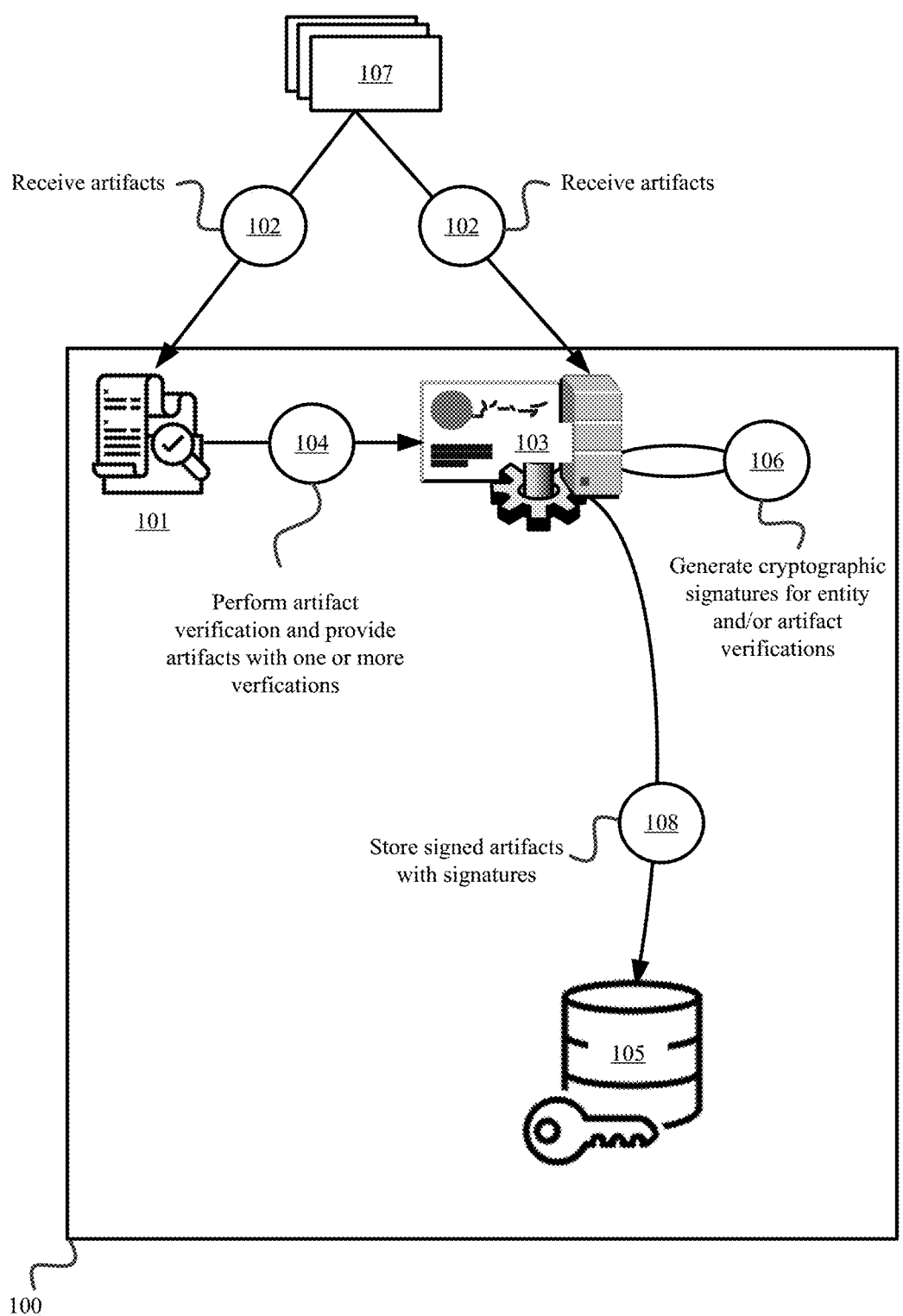
FIG. 1 illustrates an example of the cryptographic signing, storage, and/or distribution of artifacts in accordance with some embodiments presented herein.

FIG. 1 illustrates an example of the cryptographic signing, storage, and/or distribution of artifacts provided by SAR 100 in accordance with some embodiments presented herein. As shown in FIG. 1, SAR 100 may include verification module 101, signing authority 103, and repository 105.

User equipment ("UEs") 107 may submit (at 102) different artifacts to SAR 100 for verification, cryptographic signing, storage, and/or distribution. The artifacts may include one or more containers, images, virtual machines, Helm charts, Yet Another Markup Language ("YAML") files, configuration files, manifest files, scripts, executable files or packages (e.g., Red Hat Package Manager ("RPM") packages, DEB packets, etc.), binaries, software, code, and/or arbitrary blocks of data.

SAR 100 may pass (at 102) the artifacts to verification module 101. Verification module 101 may perform a variety of tests for different verifications of the artifacts.

In some embodiments, verification module 101 may perform a security verification of an artifact by scanning the artifact for security vulnerabilities, malicious code, trojans, malware, viruses, and/or other threats using one or more security scanners (e.g., Clair, Anchore, Dagda, Falco, Aqua Security, Docker Bench Security, etc.). If the security scanner detects no threats, then verification module 101 may provide (at 104) a security verification to the artifact. The security verification may include a tag that identifies the version of the one or more security scanners used to check the artifact for vulnerabilities.

In some embodiments, verification module 101 may run the artifact on different platforms to verify the compatibility of the artifact with the different platforms. For instance, verification module 101 may run the artifact on different Linux® distributions to determine if the artifact executes without crashes or other errors on those distributions, and may provide (at 104) a verification that identifies the compatible platforms.

In some embodiments, verification module 101 may test the performance and/or resource usage of the artifact (e.g., via benchmarks or comparative testing against different versions or instances of the same artifact), compatibility with other stored artifacts, required dependencies (e.g., required software libraries, file systems, directory structures, etc.), and/or other best practices defined for artifacts of different types, formats, etc. Verification module 101 may tag (at 104) an artifact with each successful verification.

In some embodiments, verification module 101 may automatically perform the different tests and/or verifications for every artifact that is uploaded to SAR 100. In some such embodiments, verification module 101 may perform different tests and/or verifications for different types of artifacts. For instance, a Helm chart may be subject to a first set of verifications and a container or container image may be subject to a different second set of verifications. In some embodiments, a developer may indicate the verifications that verification module 101 is to perform on artifacts uploaded by that developer.

In some embodiments, verification module 101 may pass (at 104) the artifacts with any tagged verifications to signing authority 103. In some embodiments, signing authority 103 may directly receive (at 102) the artifacts from UEs 107. UEs 107 may perform their own verifications of the artifacts prior to submitting (at 102) the artifacts to SAR 100. In such cases, UEs 107 may provide evidence of the verifications along with the artifacts to SAR 100, wherein the verification evidence may include signatures that are included with the artifacts. For instance, UE 107 may submit an artifact with a first verification or signature that evidences that the code for that artifact has been verified by a development team, a second verification or signature that evidences that the code have been tested by a testing team, and/or a third verification or signature that evidences that the artifact has been verified for distribution by a production team.

Signing authority 103 may securely sign (at 106) the artifacts using a secure cryptographic key. The signing (at 106) may generate one or more cryptographic signatures that provide immutable evidence about the artifact, the UE 107 or entity that originates the artifact, and/or verifications associated with the artifact. In other words, signing authority 103 may sign (at 106) an artifact to immutably associate one or more verifications that generated by verification module 101, verifications for UEs 107 or the entities represented by UEs 107, and/or verification provided by UEs 107 with that artifact. Accordingly, the set of cryptographic signatures that are generated for an artifact may securely identify the developer that originated the artifact, encrypt a checksum or other value for verifying that the contents or data of the artifact have not been altered from an original copy uploaded by the developer, verify that no threats were detected after performing security scans of the artifact, verify that the artifact is compatible with other identified artifacts or platforms, verify that the artifact is dependent on or requires specific versions of other artifacts to run, and/or provide other verifications or dependencies of the artifacts.

In some embodiments, a signed artifact may be layered with different signatures. For instance, an artifact may include two or more containers. Each of the two or more containers may be signed and may have an individual signature associated with that container, and the entire artifact may be signed and have a distinct signature from each of the containers. In some embodiments, the set of cryptographic signatures may encode one or more dependencies. For instance, the signature generated for an artifact may specify a dependency that the artifact may only be run with artifacts from the same developer, on specific hardware, with a specific set of other artifacts, as part of an application constructed of only signed artifacts, and/or constraints that may limit the deployment of the artifact.

In some embodiments, signing (at 106) the artifacts may include encrypting the contents and/or data of the artifact to prevent tampering or altering of the contents and/or data. For instance, signing authority 103 may use a private key and/or cryptographic hash function to encrypt the contents of a particular artifact and/or to embed the verifications or generated signatures as part of the encrypted contents.

Signing authority 103 may store (at 108) each signed artifact in repository 105. In some embodiments, the signatures may be embedded with or stored as part of the signed artifact. In some other embodiments, the signatures may be stored separate from the signed artifact, and may be linked or otherwise associated with the signed artifact.

Once the signed artifacts are stored (at 108) in repository 105, the signed artifacts are made available for distribution and/or for use with a variety of applications. In some embodiments, access control restrictions may be defined for a signed artifact. The access control restrictions may limit which UEs 107, platforms, and/or applications may access or use that signed artifact.

Figure 2:
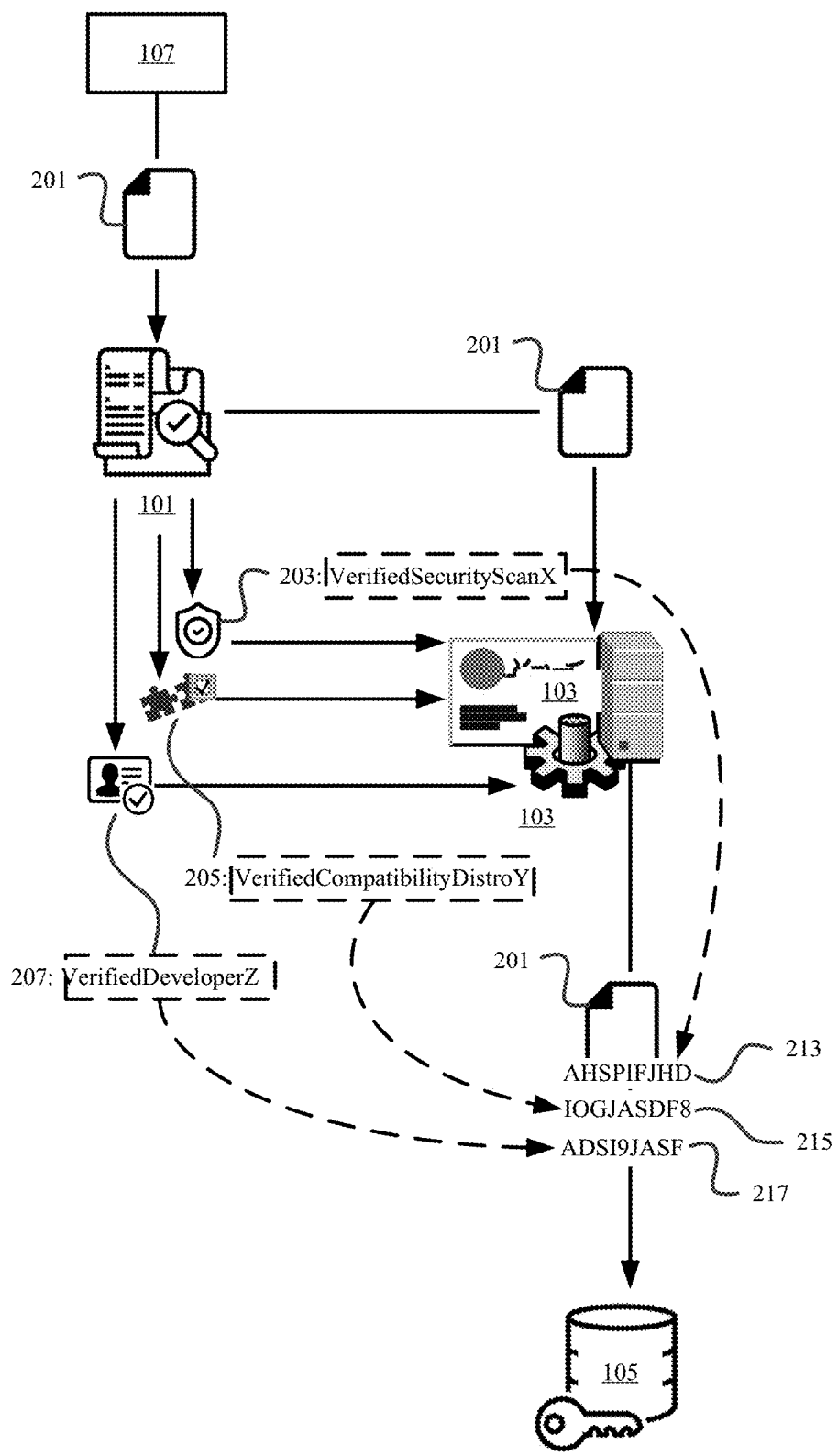
FIG. 2 illustrates an artifact signing example in accordance with some embodiments presented herein.

FIG. 2 illustrates an example of the artifact signing in accordance with some embodiments presented herein. As shown in FIG. 2, verification module 101 may receive artifact 201, and may generate verifications 203, 205, and 207 for artifact 201. Verification module 101 may provide artifact 201 along with verifications 203, 205, and 207 to signing authority 103.

Signing authority 103 may use a cryptographic hash function and a private key to generate signature 213 for verification 203, signature 215 for verification 205, and signature 217 for verification 207. Signing authority 103 may associate signatures 213, 215, and 217 with artifact 201, such that signatures 213, 215, and 217 may be distributed with artifact 201 when artifact 201 is requested from repository 105 or SAR 100. In some embodiments, signing authority 103 may further associate any signatures provided by the artifact originator with signatures 213, 215, and 217.

In some embodiments, signing authority 103 may generate a single string based on verifications 203, 205, and 207. In some such embodiments, signing authority 103 may arrange verifications 203, 205, and 207 according to a particular order, and may append each verification 203, 205, and 207 to a string according to the specified ordering. Signing authority 103 may generate a single signature for the combined string, and the single signature may be associated and distributed with artifact 201.

In any case, a public key for the private key may be used to decode verifications 203, 205, and 207 from signatures 213, 215, and 217. The public key may be distributed by signing authority 103 or repository 105 in response to requests for artifact 201 or requests to decrypt signatures 213, 215, and 217 of artifact 201.

Figure 3:
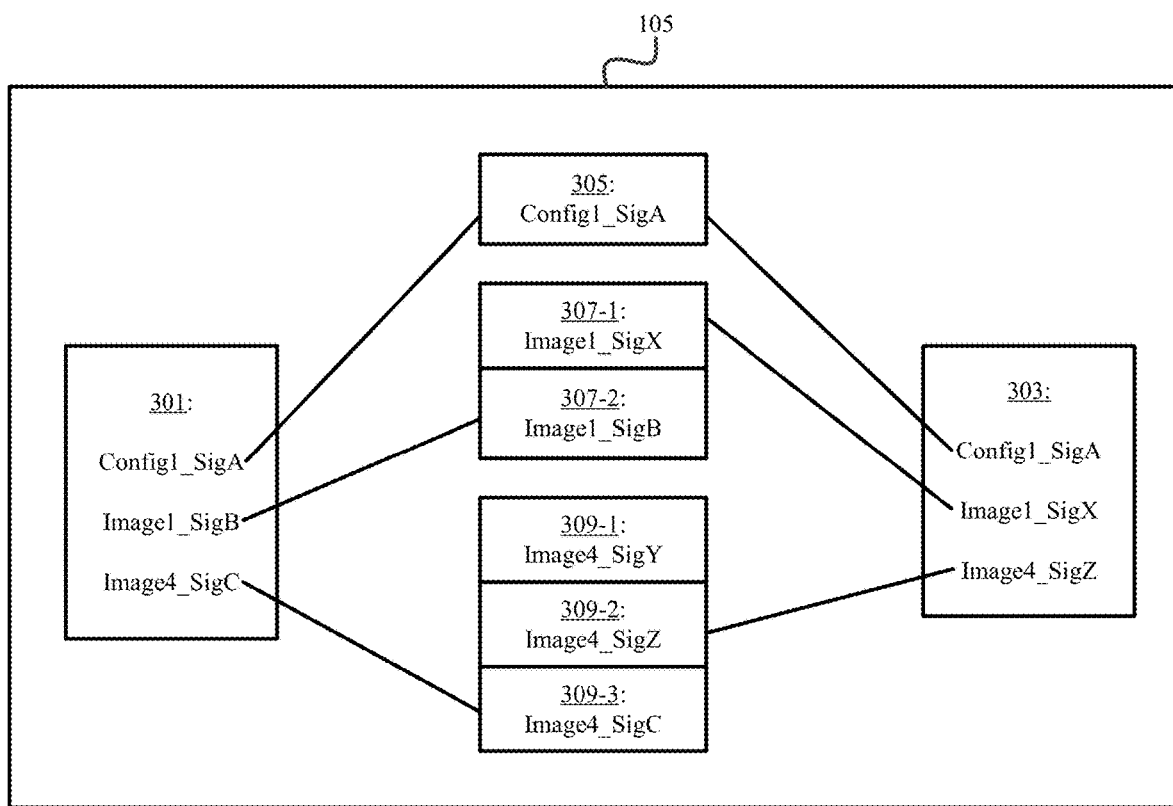
FIG. 3 illustrates an example of different signed artifacts stored and/or distributed by Signed Artifact Registry ("SAR") in accordance with some embodiments presented herein.

FIG. 3 illustrates an example of different signed artifacts stored and/or distributed by SAR 100 in accordance with some embodiments presented herein. As shown in FIG. 3, repository 105 of SAR 100 may store and/or distribute signed Helm charts, YAML files, and/or other application definitions 301 and 303, a first signed artifact 305, a second signed artifact with different signatures 307-1 and 307-2, and a third signed artifact with different signatures 309-1, 309-2, and 309-3. Signed artifacts 307-1, 307-2, 309-1, 309-2, and 309-3 may include some of the software, code, and/or components for creating different applications. For instance, signed artifacts 307-1, 307-2, 309-1, 309-2, and 309-3 may include containers, images, virtual machines, configuration files, manifest files, scripts, executable files or packages, binaries, and/or arbitrary blocks of data.

Each application definition 301 and 303 may list different sets of signed artifacts for creating the same particular application albeit with some differences that are created by executing the particular application with the different sets of signed artifacts. To avoid confusion between the two application definitions 301 and 303 for the same particular application, each application definition 301 and 303 may be associated with a signature that verifies the creator or originator of that application definition 301 and 303, and that users may reference to identify the source of that application definition 301 and 303. In some embodiments, the signature associated with application definition 301 may verify that the particular application provides a first set of features, functionality, interfaces, calls, output, etc. that a first set of developers require in their deployment of the particular application, whereas the signature associated with application definition 303 may verify that the particular application provides a second set of features, functionality, interfaces, calls, output, etc. that a second set of developers require in their deployment of the particular application. Accordingly, users may refer to the signatures associated with application definitions 301 and 303 in order to differentiate between the two, select the one that is verified to offer the desired functionality, and/or that comes from a source trusted by the user. By differentiating based on the associated signatures, users need not inspect the artifacts listed in each application definition 301 and 303 to ascertain the differences.

In some embodiments, the different signatures associated with the same particular artifact (e.g., 207-1 and 307-2, or 309-1, 309-2, and 309-3) may identify a different developer that publishes the particular artifact to SAR 100, wherein the particular artifact from the different developers may contain differences that cause the particular artifact to be compatible with different sets of other artifacts. In some embodiments, the different signatures associated with the same particular artifact may identify a different version number of the particular artifact. An application developer may have tested and run an application with a specific version of the particular artifact, and may ensure that the application is deployed with that specific version of the particular artifact based on the associated signature. In some embodiments, the different signatures associated with the same particular artifact may identify different verifications of the particular artifact. For instance, a first application developer may query SAR 100 for a signed instance of the particular artifact that verifies that the particular artifact has been security scanned for security vulnerabilities (e.g., artifact 307-1), whereas a second application developer may query SAR 100 for a signed instance of the particular artifact that verifies that the particular artifact has been optimized for a particular Linux® distribution (e.g., artifact 307-2).

In some embodiments, SAR 100 may maintain an immutable transparency log or ledger that identifies the different verifications that are associated with the signature of a signed artifact. For instance, the ledger may link a particular signature of a particular artifact to one or more verifications of that particular artifact.

Figure 4:
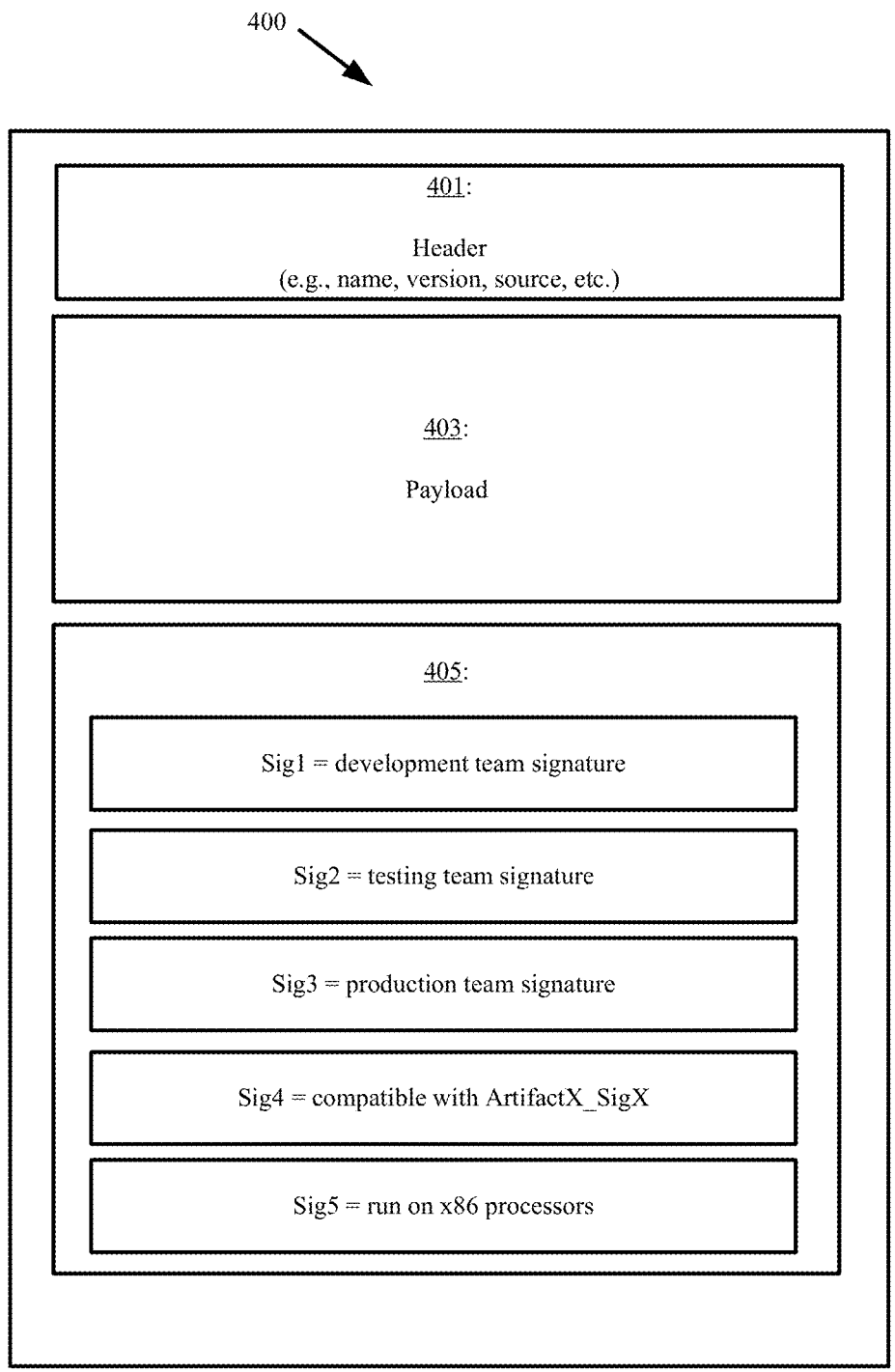
FIG. 4 illustrates an example of signing an artifact with multiple signatures in accordance with some embodiments presented herein.

In some embodiments, the artifact signature may encode two or more verifications that have been linked to or otherwise associated with the artifact. In some embodiments, the artifact may have multiple signatures with each signature providing evidence of a different verification. FIG. 4 illustrates an example of signing artifact 400 with multiple signatures in accordance with some embodiments presented herein. Artifact 400 may include header 401, payload 403, and signature fields 405.

Header 401 may include identifying information about artifact 400. For instance, header 401 may store information about the artifact name, version, originator, and/or information about the contents of artifact 400.

Payload 403 may store the contents of artifact 400. For instance, payload 403 may include the functions, software, binaries, executables, charts, and/or code for artifact 400. In some embodiments, payload 403 may include multiple partitions. Each partition may store different code or software that provide different functionality and/or that may be accessed separately using different calls.

In some embodiments, one or more of header 401 and payload 403 may be encrypted using a cryptographic hash function. The encryption may prevent header 401 and payload 403 from being modified after creation of artifact 400 and/or entry into SAR 100. In some embodiments, the different partitions within payload 403 may be separately encrypted.

Signature field 405 may store each signature that is generated for artifact 400 and/or that is associated with artifact 400. Each signature may encode a different verification for artifact 400. In some embodiments, SAR 100 may perform one or more verifications of artifact 400, generate one or more signatures to immutably record each verification, and may embed the signatures in signature field 405. In some embodiments, SAR 100 may receive artifact 400 with one or more signatures for verifications provided by the artifact originator or another trusted source, and include the received signatures along with any generated signatures in signature field 405.

As shown in FIG. 4, artifact 400 may include a first signature that verifies that artifact 400 was created by a specific development team, a second signature that verifies that artifact 400 was successfully tested by a specific testing team, a third signature that verifies that artifact 400 was inspected and approved by a specific production team, a fourth signature that verifies that artifact 400 is compatible with another signed artifact with a particular name and signature, and a fifth signature that verifies that artifact 400 is compatible with and/or successfully runs on a particular compute platform.

Accordingly, each signature may provide evidence of one or more verifications, and may be generated using a cryptographic hash function and a private key. The cryptographic hash function and the private key may be used to scramble or encode the one or more verifications into an immutable and/or encrypted alphanumeric string.

SAR 100 may distribute a public key that may be used to unscramble or decode the one or more verifications from a signature without the ability to change any of the verification information within the signatures. In other words, an entity is unable to tamper with artifact 400 once it has been signed. Changing any of the encrypted content in header 401, payload 403, or signature field 405 would prevent the data or verifications from being decoded and read out in unencrypted form with the public key, and would provide evidence that artifact 400 and/or the signatures in signature field 405 have been tampered with. Similarly, signatures in signature field 405 that cannot be decoded using the public key obtained from SAR 100 and/or the artifact originator may provide evidence that artifact 400 was tampered with and that signature field 405 may contain verifications from untrusted sources.

In some embodiments, signature field 405 may be stored separate from header 401 and payload 403 of artifact 400. For instance, signature field 405 may be stored in a database and may be accessed using a unique identifier of artifact 400. The unique identifier may include a single signature that is generated from signing header 401 and/or payload 403, and the unique identifier may be linked to signature field 405 that contains the signatures for the different verification performed for artifact 400.

In some embodiments, SAR 100 may generate a single signature for header 401 and/or payload 403 of artifact 400, and may link all verifications associated with artifact 400 in an unencrypted format to the single signature. For instance, when a request is made for signed artifact 400, SAR 100 may query a database using the unique signature of signed artifact 400, and may provide the signed artifact along with any verifications stored for that signed artifact to the requestor.

Accordingly, SAR 100 may provide a trusted repository or registry of signed artifacts, wherein the cryptographic signatures associated with each signed artifact provide immutable evidence of different verifications associated with each artifact that users may reference in order to construct applications with artifacts from trusted sources, with a verified state, compatibility, functionality, operation, and/or performance, and/or with other verifications that may ensure that the application will function as expected with minimal customization, testing, debugging, and/or manual verification.

AAC may perform a trusted and secure deployment of the signed artifacts from SAR 100 across different compute nodes that are managed and/or controlled by SAC. In some embodiments, AAC may retrieve signed artifacts from SAR 100 and may enforce signature and/or verification requirements prior to deploying the signed artifacts across the different compute nodes, thereby shielding the application developer from unsafe, untrustworthy, and/or unverified artifacts or application components. In some embodiments, the signature and/or verification requirements enforced by AAC as part of the trusted and secure deployment may be defined within the signatures of the signed artifacts, an application definition, and/or control lists of AAC and/or the compute nodes tasked with running the deployed artifacts of a particular application.

Figure 5:
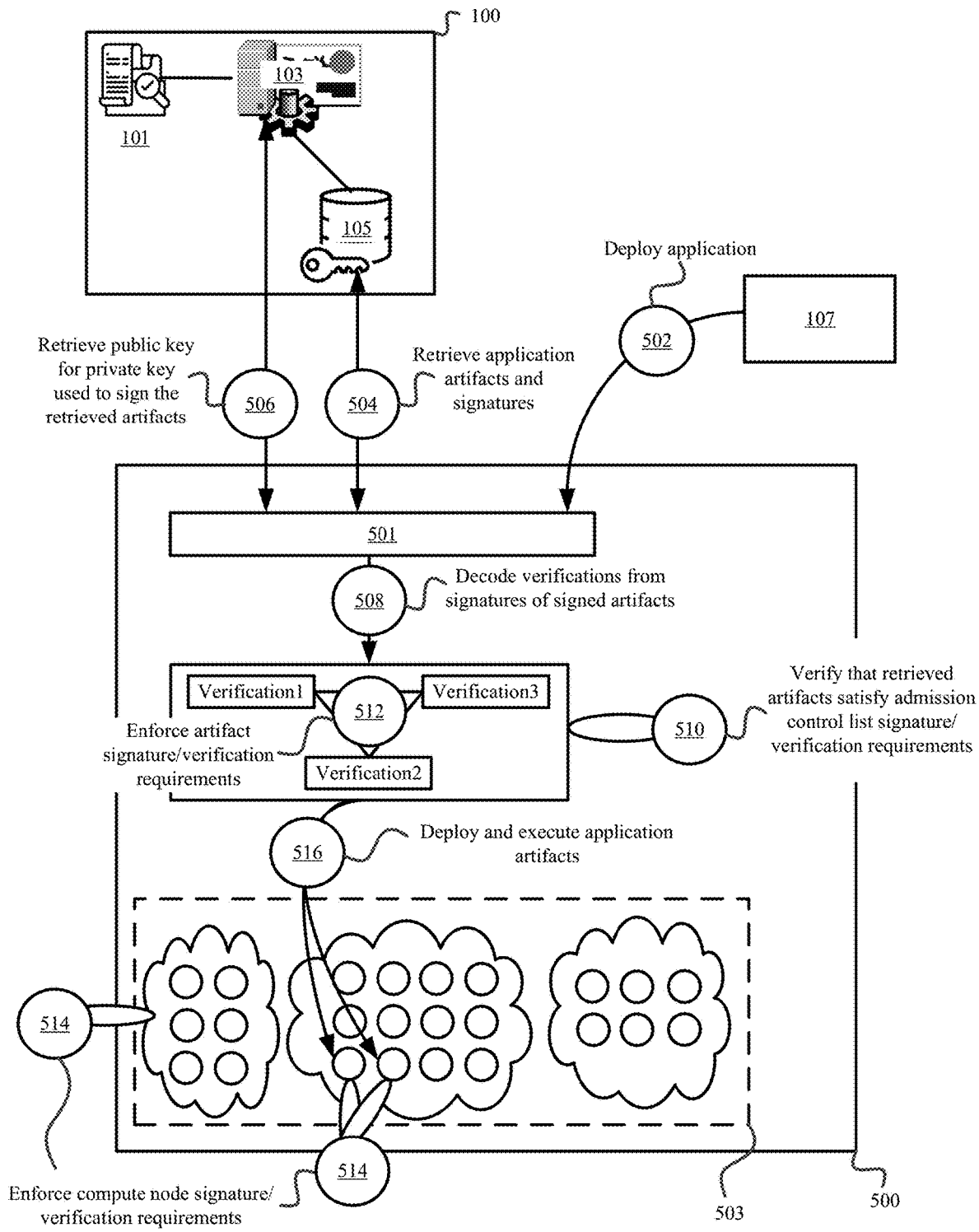
FIG. 5 illustrates an example of the trusted and secure deployment of signed artifacts in accordance with some embodiments presented herein.

FIG. 5 illustrates an example of the trusted and secure deployment of signed artifacts by the AAC in accordance with some embodiments presented herein. As shown in FIG. 5, AAC 500 may include orchestrator 501 and different compute nodes 503.

In some embodiments, orchestrator 501 may manage and/or control the deployment of different artifacts and/or applications across compute nodes 503. Compute nodes 503 may include different hardware resources that may be allocated for execution of different services and/or tasks of applications defined by one or more artifacts and/or other software or code.

AAC 500 may receive (at 502) an instruction to deploy and execute a particular application on compute nodes 503. The instruction may include names and/or identifiers (e.g., Uniform Resource Locators ("URLs")) for one or more artifacts of the particular application, or an application definition that (e.g., a Helm chart, YAML file, manifest, etc.) identifies the one or more artifacts of the particular application. The instruction may be issued by UE 107 and/or an application developer that constructs the particular application from signed and unsigned artifacts in SAR 100 and/or another repository or registry of artifacts (e.g., GitHub®).

AAC 500 may retrieve (at 504) the artifacts of the particular application from SAR 100 and/or another repository. Retrieving (at 504) the artifacts may include retrieving the unencrypted or encrypted contents of each artifact with signatures that are embedded, linked, and/or otherwise associated with the artifacts.

AAC 500 may also retrieve (at 506) one or more public keys for decrypting any signed artifacts and/or decoding the verifications from the signatures of the signed artifacts. AAC 500 may query SAR 100 and/or another signing authority for the correct key (e.g., a public key for the private key that SAR 100, the artifact originator, and/or another trusted signing authority used to encrypt the artifacts).

AAC 500 may decrypt and/or decode (at 508) the signed artifacts and/or the verifications from the signatures of the signed artifacts using the one or more public keys. For instance, AAC 500 may convert the encrypted alphanumeric string of a particular signature into a machine-readable format that identifies one or more verifications. In some embodiments, the machine-readable format may include a key-value pair, wherein the key is an identifier for a defined verification and the value indicates the verified state of the defined verification.

In some embodiments, AAC 500 may enforce a first set of signature and/or verification requirements that are defined as part of the AAC control list. In some embodiments, AAC 500 may be configured with one or more control lists that apply to different types of applications, application developers, and/or artifact originators, and may select a particular AAC control list based on the particular application, identification of the entity requesting the particular application, and/or the retrieved artifacts.

Each control list may specify different signature and/or verification requirements for the artifacts and/or application being deployed. For instance, a first control list for applications requested by or run on behalf of a first user may require that the application artifacts be signed to originate from a particular trusted sources, and a second control list for applications requested by or run on behalf of a second user may allow application artifacts to come from different trusted sources provided that the application artifacts are signed to verify that the application artifacts were scanned with one or more security scanners and do not contain a scanned set of vulnerabilities.

AAC 500 may compare the verifications that are decoded from the signatures of the retrieved artifacts against the first set of signature and/or verification requirements from the selected AAC control list, and may determine (at 510), based on the comparison, whether the retrieved artifacts contain the required verifications for deploying the retrieved artifacts and/or the particular application to compute nodes 503. For instance, if the AAC control list requires all retrieved artifacts to be signed as originating from a particular trusted source, and if one or more of the retrieved artifacts are determined by AAC 500 to not be signed or are signed with a signature of another source, then AAC 500 may cancel the deployment, provide an alert or notification to the requestor, and/or replace the invalid artifacts with the same artifact from SAR 100 that contain the required signatures. In some embodiments, the AAC control list may require that the retrieved artifacts have been security scanned against certain vulnerabilities, are compatible with certain operating systems, have been defined according to certain best practices, contain certain programming languages, are compiled with a specific set of compilers, contain specific software libraries or dependencies, bear signatures of specific teams or entities, and/or provide evidence of other verifications.

In some embodiments, AAC 500 may enforce (at 512) a second set of signature and/or verification requirements that are specified within one or more of retrieved artifacts. For example, AAC 500 may be configured to inspect an application configuration file, such as a Helm chart, for the second set of signature and/or verification requirements. The Helm chart artifact may specify, require, and/or identify a specific set of signed artifacts to be included as part of the particular application (e.g., artifacts with specific names or identifiers and with specific signatures). AAC 500 may compare names, signatures, and/or other identifiers of the retrieved set of signed artifacts against the names, signatures, and/or other identifiers specified for the specific set of signed artifacts in the Helm chart. If the signatures of the retrieved artifacts do not match the signatures specified for the same artifacts in the Helm chart, AAC 500 may prevent deployment of those artifacts on the compute nodes, provide an alert or notification to the requestor, and/or replace the artifact with the incorrect signature with the same artifact having the correct signature from SAR 100. As a specific example, SAR 100 may store multiple instances of the same artifact that were created by different developers, and each instance may contain the signature of a different developer. Each instance of the artifact may provide the same base functionality, but may be coded differently such that the different instance may behave differently or have different compatibility. The Helm chart may require that a particular instance of the artifact containing the signature of a particular developer be deployed as part of the particular application, and AAC 500 may enforce that requirement and/or other requirements specified in the Helm chart. Accordingly, if the instance of the artifact retrieved as part of the application definition contains the signature of another developer (e.g., a developer other than the particular developer), AAC 500 may prevent the deployment of that artifact. Otherwise, the if the instance of the artifact retrieved as part of the application definition contains the signature of the particular developer, then AAC 500 may include that artifact as part of the application deployment to compute nodes 503.

In some embodiments, the second set of signature and/or verification requirements may be defined and/or encoded as part of the signatures of a particular artifact. In some such embodiments, the signatures may verify software, hardware, and/or other dependencies of that particular artifact. For instance, a first container may be signed with a signature that verifies that the first container is only compatible with a first version of a second container. AAC 500 may decode the signature from the first container, and may enforce the requirement that the second container included as part of the particular application with the first container be of the first version. If the retrieved second container is of a different second version, AAC 500 may halt the deployment, generate a message regarding the signature violation of the second container, and/or may query SAR 100 to replace the second version of the second container with the first version of the second container. Accordingly, AAC 500 may enforce the second set of signature and/or verification requirements that are defined within an application definition (e.g., a Helm chart) and/or that are encoded within one or more signatures of one or more of the retrieved artifacts.

In some embodiments, AAC 500 may enforce (at 514) a third set of signature and/or verification requirements based on control lists of compute nodes 503. In some embodiments, different compute nodes 503 may provide different hardware resources for executing different applications with different levels of performance, and/or may provide hardware resources for different software and/or hardware platforms. For instance, compute nodes 503 may include a mix of devices that include x86, Reduced Instruction Set Computer ("RISC") or Advanced RISC Machine ("ARM") processors, and/or other microprocessor architectures. Some compute nodes 503 may include specialized artificial intelligence or neural network processors, Graphics Processing units ("GPUs"), and/or other special-purpose processors. In some embodiments, some compute nodes 503 may provide more network bandwidth, more processing cores, more memory, and/or other variations in hardware resources than other compute nodes 503.

Accordingly, different control lists may be defined for different compute nodes 503, and the control lists may specify signature and/or verification requirements for artifacts that are permitted to run on those compute node 503. For instance, a first set of compute nodes may be reserved for a particular developer, and the compute node control lists of the first set of compute nodes may specify running only signed artifacts with the signature of the particular developer. Similarly, a second set of compute nodes may be used to run sensitive or mission-critical applications, and the compute node control lists of the second set of compute nodes may specify running only signed artifacts with a signature that verifies that the signed artifacts have been successfully security scanned and did not contain any scanned-for vulnerabilities.

To enforce (at 514) the third set of signature and/or verification requirements, AAC 500 may select one or more available compute nodes 503, and may obtain the compute node control lists that are defined for the selected compute nodes 503. In some embodiments, the selection of the available compute nodes 503 may be based on least-used criteria or basic compatibility criteria. For instance, if the particular application contains artifacts compiled for x86 processors, then AAC 500 may select an initial set of compute nodes 503 with x86 processors that have been idle for the longest period of time. AAC 500 may compare the third set of signature and/or verification requirements specified in the obtained compute node control lists against the verifications that are decoded from the retrieved artifacts.

In response to detecting that one or more artifacts do not contain verifications that satisfy the third set of signature and/or verification requirements for running on the selected compute nodes 503, AAC 500 may select a different set of compute nodes 503, may obtain the control lists for the newly selected set of compute nodes 503, and may verify that the retrieved artifacts satisfy the signature and/or verification requirements of the newly selected set of compute nodes 503 before deployment thereon. In this manner, AAC 500 may ensure that the artifacts of an application are deployed to and run on the correct hardware and/or optimal set of hardware for that application. For instance, a signed artifact comprising a Helm chart may include a signature that identifies a minimum set of hardware resources for running the defined application, and AAC 500 may select and allocate the set of compute nodes that satisfy the minimum set of hardware resources based on the hardware-specific control lists of the control lists.

In response to verifying each retrieved artifact for a particular application against the AAC control list (e.g., the first set of signature and/or verification requirements), the individual artifact requirements (e.g., the second set of signature and/or verification requirements), and/or the compute node control lists (e.g., the third set of signature and/or verification requirements) of a selected set of compute nodes 503, AAC 500 may reserve and/or allocate resources of the selected set of compute nodes 503 for execution of the particular application, and may deploy (at 516) the artifacts of the particular application to the allocated set of compute nodes 503.

In some embodiments, each compute node 503 or set of compute nodes 503 may include a process that performs the compute node control list verification on behalf of orchestrator 501, installs the deployed artifacts to run on the hardware resources, and/or configures the hardware resources to execute the installed artifacts. In some such embodiments, orchestrator 501 may deploy artifacts of an application verified against the first and second sets of signature and/or verification requirements to different compute nodes 503, and each compute node 503 may independently verify the artifacts against that compute node's control list before notifying orchestrator 501 of a decision as to whether the artifacts are verified to run on that compute node 503.

Figure 6:
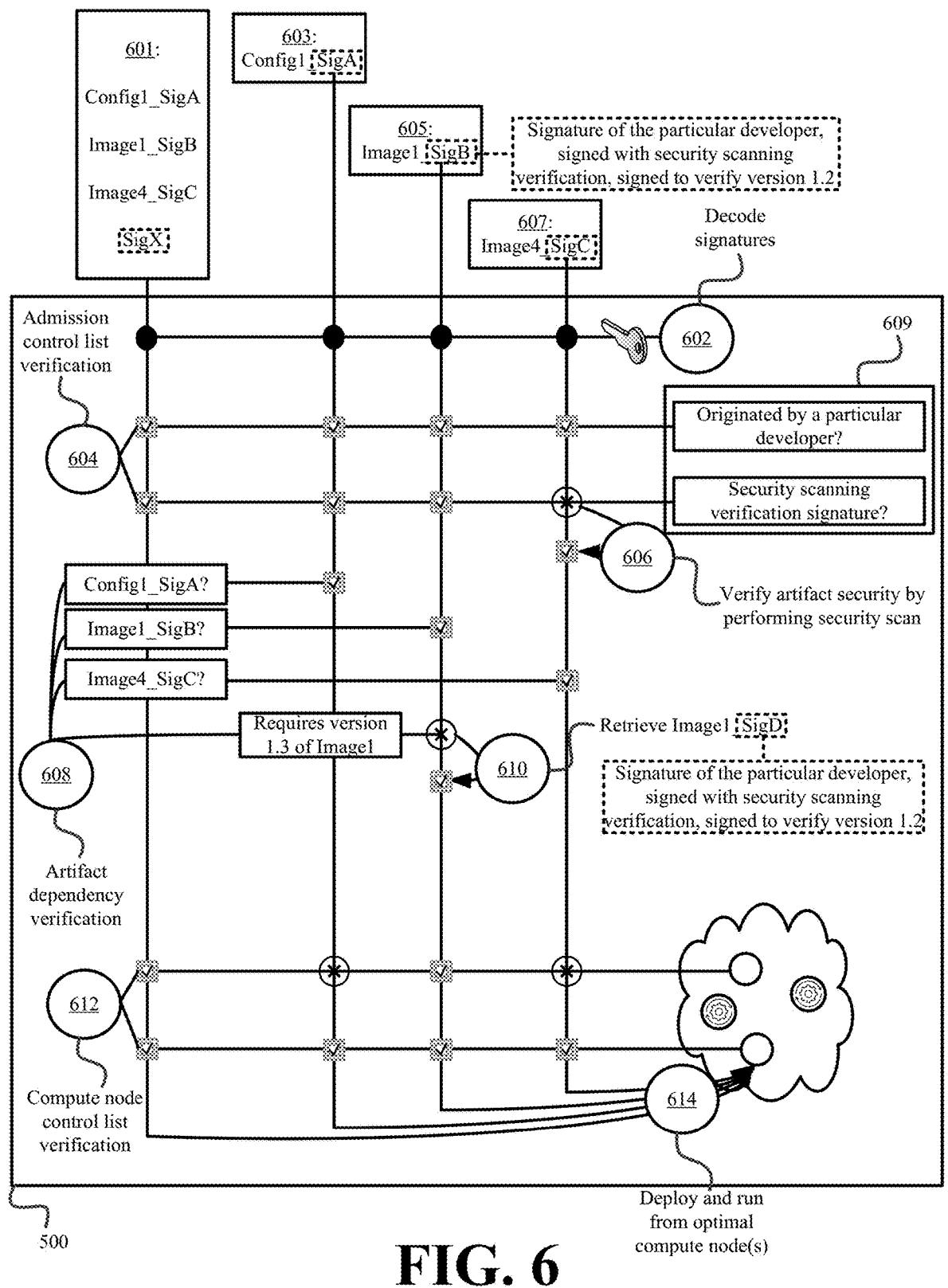
FIG. 6 illustrates an example of different artifact verifications performed as part of the trusted deployment of a particular application in accordance with some embodiments presented herein.

FIG. 6 illustrates an example of different artifact verifications performed by AAC 500 as part of the trusted deployment of a particular application in accordance with some embodiments presented herein. As shown in FIG. 6, AAC 500 may receive application definition artifact 601 that lists the components of the particular application, and first signed artifact 603, second signed artifact 605, and third signed artifact 607 that represent the components of the particular application.

AAC 500 may decode and/or decrypt (at 602) each artifact 601, 603, 605, and 607 and/or their associated signatures. In particular, AAC 500 may decrypt the encrypted header and/or payload of each artifact 601, 603, 605, and 607, and/or may extract one or more verifications from each artifact signature.

AAC 500 may verify (at 604) each artifact 601, 603, 605, and 607 against admission control list 609. Admission control list 609 may specify signature and/or verification requirements that each artifact 601, 603, 605, and 607 must satisfy in order to be deployed and/or run as part of the particular application. In this example, admission control list 609 may inspect the signature of each artifact 601, 603, 605, and 607 (e.g., the verifications decoded from each signature) to verify that the artifacts 601, 603, 605, and 607 originated from the same particular developer, were scanned for security vulnerabilities using one or more security scanners, and/or did not contain any scanned-for vulnerabilities.

AAC 500 may detect that artifact 607 violates the admission control list signature and/or verification requirement that artifact 607 have undergone a security scan. In response to the detected violation, AAC 500 may terminate the deployment and may generate a text message, email, audio recording, user interface ("UI") alert, and/or other notification that identifies the issue associated with artifact 607 that prevents the deployment. Alternatively, as shown in FIG. 6, AAC 500 may dynamically perform (at 606) the missing verification by scanning artifact 607 for a set of vulnerabilities, and verifying that artifact 607 does not contain any scanned-for vulnerabilities. In some embodiments, AAC 500 may provide artifact 607 to verification module 101 of SAR 100 with a request for verification module 101 to perform the missing verification, and verification module 101 may respond to AAC 500 with a message indicating the verification status.

AAC 500 may further verify (at 608) each artifact 601, 603, 605, and 607 against constraints specified in one or more of artifacts 601, 603, 605, and 607. For instance, application definition artifact 601 may correspond to a Helm chart that enumerates specific signed artifacts that are to be included as part of the particular application. AAC 500 may verify that the signature of artifacts 603, 605, and 607 match the signature that is specified for those same artifacts 603, 605, and 607 in application definition artifact 601. Additionally, the signature of artifact 603 may specify a compatibility requirement or dependency with a particular version of artifact 605. AAC 500 may inspect the signature of artifact 605, and may detect that the incorrect or incompatible version of artifact 605 was retrieved. Accordingly, AAC 500 may terminate the deployment, raise an error, and/or retrieve the correct or compatible version of artifact 605 from SAR 100 and/or another repository. As shown in FIG. 6, AAC 500 may resolve the issue so that the deployment may continue by automatically replacing (at 610) artifact 605 with the correct or compatible version of artifact 605 that also satisfies all other signature and/or verification requirements.

AAC 500 may further verify (at 612) each artifact 601, 603, 605, and 607 against one or more compute node control lists. In some embodiments, AAC 500 may select one or more available compute nodes, retrieve the control lists defined for the selected compute nodes, and compare the verifications from the decoded artifact signatures against the compute node control lists. In some embodiments, AAC 500 may be configured with the compute node control lists, or may retrieve the compute node control lists from the selected compute nodes.

In response to signatures of one or more of artifacts 601, 603, 605, and 607 not matching or satisfying constraints or requirements specified by the AAC 500 control list, other artifacts, and/or the compute node control list, AAC 500 may cancel the deployment of artifacts 601, 603, 605, and 607 onto the selected compute node. Additionally, AAC 500 may generate a notification message to send to the application requestor to notify the application requestor of the failed deployment, the one or more artifacts that caused the deployment to fail, and/or the verifications that the one or more artifacts failed.

In response to signatures of one or more of artifacts 601, 603, 605, and 607 matching or satisfying constraints or requirements specified by the AAC 500 control list, other artifacts, and/or the compute node control list, AAC 500 may deploy and run artifacts 601, 603, 605, and 607 on the selected compute nodes. As shown in FIG. 6, AAC 500 may allocate and deploy (at 614) artifacts 601, 603, 605, and 607 to run on the one or more compute nodes that provide the compatible and optimal set of hardware resources for those artifacts 601, 603, 605, and 607. More specifically, AAC 500 may determine that the verifications included with the signatures of artifacts 601, 603, 605, and 607 satisfy all or the most signature and/or verification requirements from the control lists of a specific set of compute nodes, and may allocate and deploy (at 614) artifacts 601, 603, 605, and 607 to that specific set of compute nodes.

Figure 7:
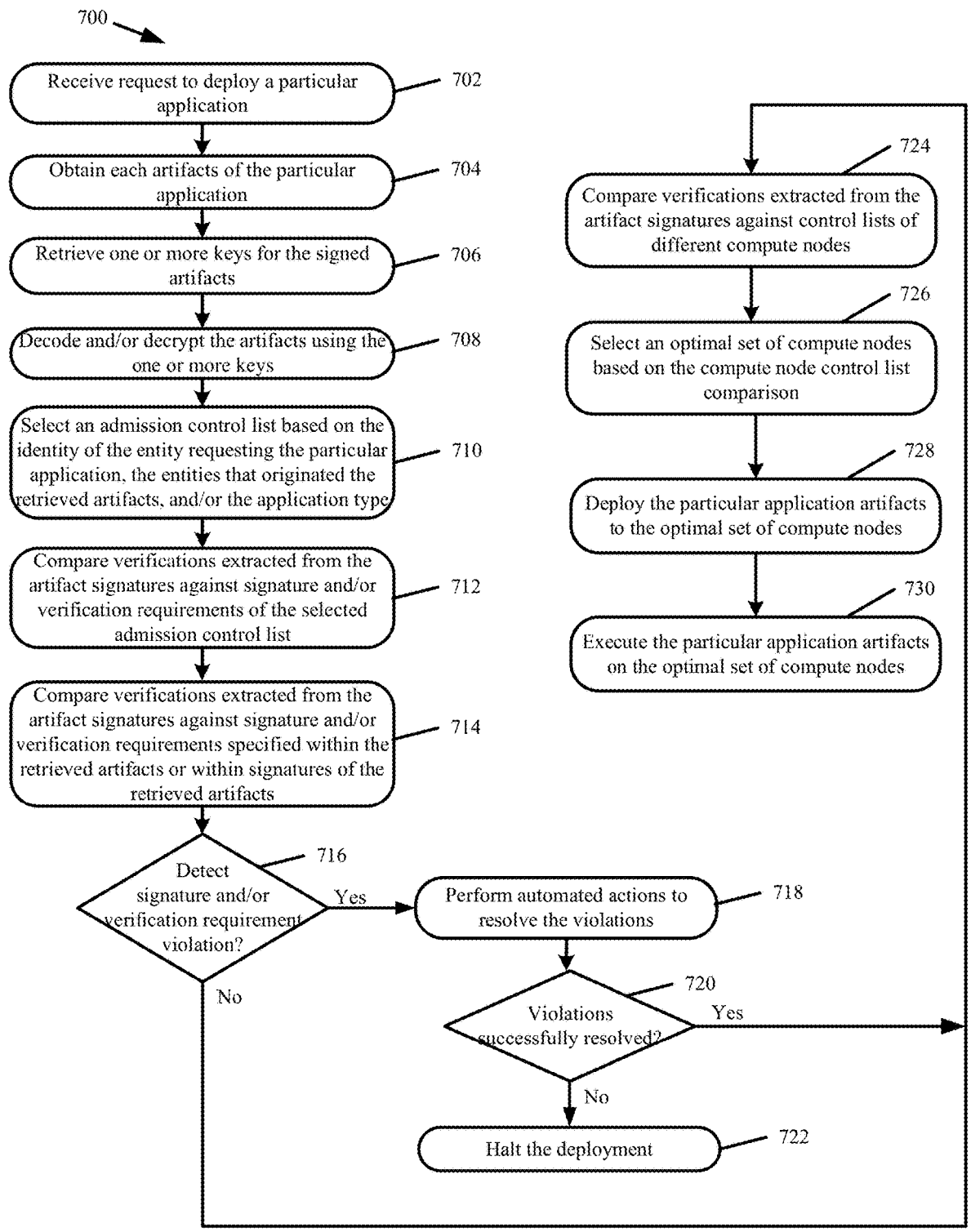
FIG. 7 presents a process for trusted and secure application deployment based on collective signature verification of the application artifacts in accordance with some embodiments presented herein.

FIG. 7 presents a process 700 for trusted and secure application deployment based on collective signature verification of the application artifacts in accordance with some embodiments presented herein. Process 700 may be implemented by AAC 500 independent or in conjunction with SAR 100 and/or another signed artifact repository.

Process 700 may include receiving (at 702) an instruction, message, command, and/or request to deploy a particular application onto one or more compute nodes that are managed and/or controlled by AAC 500. In some embodiments, the request may include a Helm chart and/or another application configuration or definition that defines the artifacts of the particular application. In some other embodiments, the request may include a name or identifier of the particular application, and AAC 500 may query SAR 100 to determine the artifacts of the particular application.

Process 700 may include obtaining (at 704) each of the artifacts of the particular application. In some embodiments, AAC 500 may obtain (at 704) the artifacts directly from the requestor sending the request. In some such embodiments, the artifacts may be sent with the request or as part of the request. For instance, the request may include a file that contains each of the particular application artifacts within the file contents. Alternatively, the request may include an application definition file with URLs, links, and/or other identifiers for retrieving the artifacts from the requestor. In some embodiments, AAC 500 may query SAR 100 and/or other artifact repositories for each of the particular application artifacts, and may obtain (at 704) the artifacts in response to the queries.

Process 700 may include retrieving (at 706) one or more keys for the signed artifacts. In particular, each signed artifact may be signed with one or more private keys of the artifact originator, different entities that create and/or distribute the artifacts (e.g., development team, testing team, production team, etc.), a signing authority (e.g., SAR 100) that performs various verifications of the artifacts before generating the signature to evidence the verifications, and/or other entities. The entities that sign the artifacts may share and/or provide a public key that AAC 500 may use to validate the artifact signatures and/or decode the verifications provided with the signatures without having the ability to alter, change, or add to the signatures. AAC 500 may obtain the public keys from SAR 100, the signing entity, and/or another site.

Process 700 may include decoding and/or decrypting (at 708) the artifacts using the one or more keys. In some embodiments, AAC 500 may use the one or more keys to decrypt the obfuscated contents of an encrypted artifact, thereby returning the contents to their original machine-readable or human-readable form. In some embodiments, AAC 500 may use the one or more keys to decode the signatures of the retrieved artifacts. In some such embodiments, the decoding may include extracting different verifications that have been embedded as part of the one or more signatures of each signed artifact and/or validating information contained within the artifacts based on the extracted verifications.

Process 700 may include selecting (at 710) an admission control list from a plurality of available admission control lists based on one or more of the identity of the entity requesting the particular application, the one or more entities that defined, created, and/or originated the retrieved artifacts, and/or the application type. For instance, AAC 500 may select (at 710) and verify the application artifacts against a first set of signature and/or verification requirements of a first admission control list when the requested application is for a secure or mission critical service (e.g., banking, autonomous driving, etc.), and may select (at 710) and verify the application artifacts against a different second set of signature and/or verification requirements of a second admission control list when the artifacts are defined, created, and/or originated by internal or trusted sources.

Process 700 may include comparing (at 712) the artifact signatures and/or the verifications that are decoded and/or extracted from the artifact signatures against signature and/or verification requirements of the selected admission control list. In some embodiments, the admission control list may include basic requirements that apply to individual artifacts. For instance, a basic requirement may require that each retrieved artifact be signed or that each retrieved artifact be signed with the signature of a trusted source. In some embodiments, the admission control list may include more complex requirements that are conditioned on the signatures or verifications of two or more the retrieved artifacts. For instance, a complex requirement may require that the retrieved artifacts be signed with the signature of a single source, have a particular verification (e.g., all artifacts have been security scanned using a particular security scanner to ensure that they do not contain any of a scanned-for set of vulnerabilities), have compatible versioning, provide verification that they have been run or tested together, and/or satisfy other verifiable dependencies or conditions. Generally, a dependent verification may be defined such that if a first artifact has a first verification or a first signature, then a second artifact of a particular type must have a second verification or a second signature.

Process 700 may include comparing (at 714) the artifact signatures and/or the verifications that are decoded and/or extracted from the artifact signatures against signature and/or verification requirements specified within the retrieved artifacts or within signatures of the retrieved artifacts. In this case, AAC 500 may ensure that dependencies specified between artifacts of a particular application are enforced. For instance, a Helm chart of the particular application may require the construction of the particular application with artifacts that have specific signatures or verifications. AAC 500 may scan the Helm chart, identify the specific signature or verification requirements, and verify that the other retrieved artifacts for the particular application adhere to the specific signature or verification requirements specified in the Helm chart. Similarly, the signature of a first application artifact may require deployment with a second application artifact having a particular signature for a particular version, originating source, verification, and/or other dependency.

Process 700 may include detecting (at 716) any violations of the requirements specified in the admission control list, another artifact of the particular application, and/or in the signature of another artifact. A violation may occur when a retrieved artifact does not contain a signature for a particular verification required in the admission control list or by another artifact of the particular application. For instance, a violation may occur when the admission control list requires that all deployed artifacts contain a valid signature and at least one of the retrieved artifacts is unsigned, or when a first artifact contains a signature that specifies compatibility with a particular version of a second artifact and the signature of the second artifact identifies an incompatible version of the second artifact.

In response to detecting (at 716—Yes) one or more violations, process 700 may include performing (at 718) one or more automated actions to resolve the violations. In some embodiments, performing (at 718) the one or more automated actions may include determining a verification that was omitted from the signature of an artifact, and dynamically performing the omitted verification. This may include scanning the artifact for vulnerabilities using one or more security scanners, testing the performance of the artifact, verifying compatibility of the artifact with other artifacts or a set of hardware resources, verifying artifact versioning, and/or validating other aspects of the artifact at deployment time or prior to deployment time. In some embodiments, performing (at 718) the one or more automated actions may include querying SAR 100 and/or another repository for a different signed instance of an artifact that has the signatures to verify each of the signature and/or verification requirements.

Process 700 may include determining (at 720) if the automated actions successfully resolved the violations. For instance, a replacement artifact may be compared (at 712 and 714) against the signature and/or verification requirements from the selected admission control list and/or the other artifacts. In response to determining (at 720—No) that the one or more violations are not successfully resolved, process 700 may include halting (at 722) deployment of the particular application. Halting (at 722) the deployment may include preventing the particular application and its artifacts from being deployed or executed on the compute nodes that are controlled or managed by AAC 500. Halting (at 722) the deployment may include generating and sending error messaging to the application requestor to identify the cause of the deployment failure and/or the detected violations. In some embodiments, AAC 500 may generate a UI that presents each of the artifacts of the particular application, a status that indicates whether the artifacts are deployable or not, and/or a description for the violations detected for one or more artifacts that cannot be deployed.

In response to determining (at 720—Yes) that the one or more violations are successfully resolved or in response to detecting (at 716—No) that the retrieved artifacts satisfy the signature and/or verification requirements of the admission control list or other artifacts, process 700 may include comparing (at 724) the artifact signatures and/or the verifications extracted from the artifact signatures against control lists of different compute nodes. The compute node control lists may include signature and/or verification requirements for artifacts that may be run on the hardware resources of those compute nodes. For instance, a secure set of compute nodes may require that any deployed artifacts contain a signature that verifies that those artifacts have been security scanned for certain network attacks. A set of GPU compute nodes may require than any deployed artifacts contain a signature that verifies that those artifacts include verified versions of a graphics library, or contain a signature that verifies that those artifacts require GPU resources. In some embodiments, the compute node control list for a particular node may enumerate available hardware resources of that particular node, and AAC 500 may determine an allocation of hardware resources for executing the particular application with a threshold level of performance.

Process 700 may include selecting (at 726) an optimal set of compute nodes for the trusted deployment of the particular application based on the compute node control list comparison. In particular, AAC 500 may select (at 726) the optimal set of compute nodes based on the artifact signatures and/or the verifications extracted from the artifact signatures satisfying the control lists of the optimal set of compute nodes, and/or the optimal set of compute nodes containing the hardware resources needed to provide the threshold level of performance for the particular application.

Process 700 may include deploying (at 728) the particular application artifacts to the optimal set of compute nodes. Deploying (at 728) the particular application artifacts may include allocating hardware resources of the optimal set of compute nodes for the particular application and/or installing and configuring the particular application artifacts to run on the allocated hardware resources.

Process 700 may include executing (at 730) the particular application using the allocated hardware resources of the optimal set of compute nodes. Executing (at 730) the particular application may include providing services, functionality, and/or other features through the collective execution of the particular application artifacts. More specifically, output from a first application artifact may be used as input by one or more other application applications to produce the application output. Similarly, output from two or more application artifacts may be combined to produce the application output.

Figure 8:
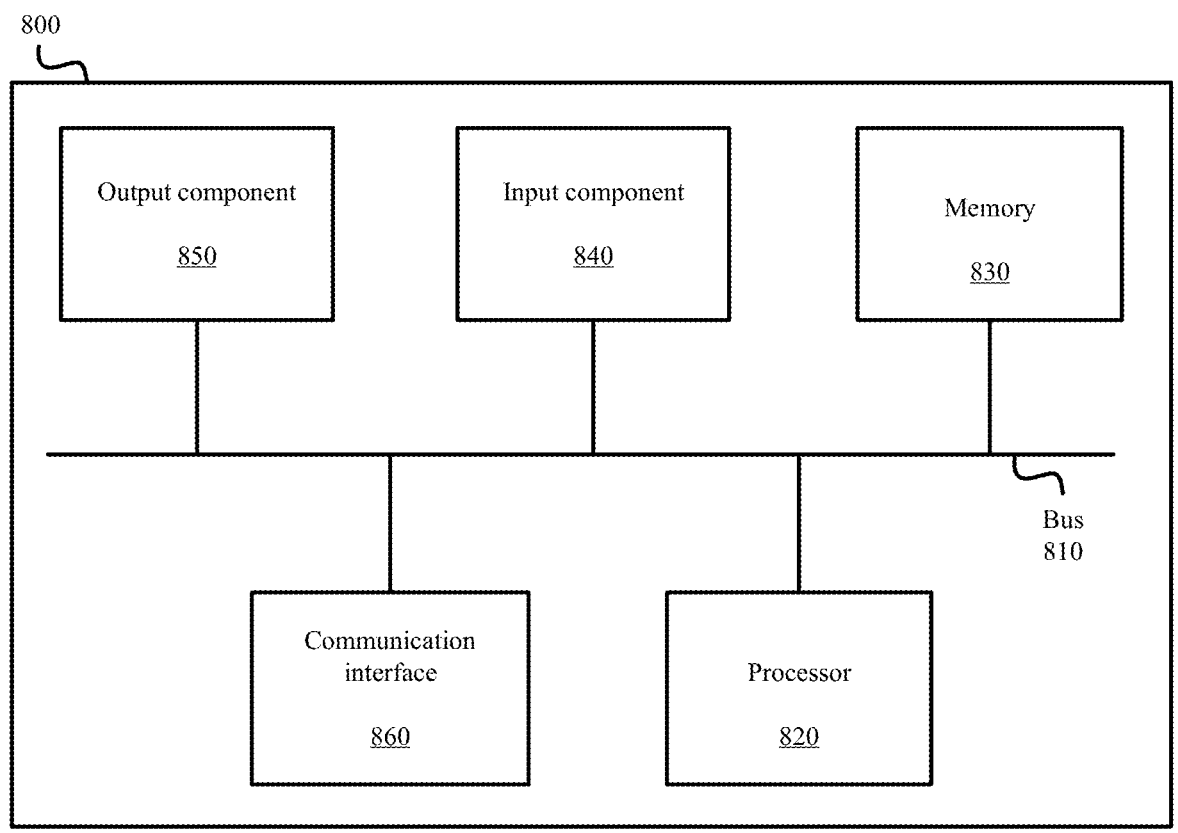
FIG. 8 illustrates example components of one or more devices, according to one or more embodiments described herein.

FIG. 8 is a diagram of example components of device 800. Device 800 may be used to implement one or more of the devices or systems described above (e.g., SAR 100, AAC 500, UEs 107, compute nodes 503, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising
receiving a request to deploy an application that is defined with a set of artifacts;
receiving a particular artifact that comprises at least one cryptographic signature and functionality that is defined as part of the application and other applications;
decoding one or more verifications of the particular artifact from the at least one cryptographic signature;
selecting an admission control list from a plurality of admission control lists based on the request to deploy the application, wherein the admission control list comprises a set of identifiers that identify the set of artifacts forming the application, at least one dependency that the particular artifact have with another artifact of the set of artifacts that runs as part of the application, and a set of requirements associated with each identifier of the set of identifiers; and
deploying the particular artifact to provide the functionality for the application in response to an identifier of the particular artifact matching a particular identifier from the set of identifiers of the admission control list, and the one or more verifications that are decoded from the at least one cryptographic signature of the particular artifact satisfying the at least one dependency and the set of requirements associated with the particular identifier in the admission control list of the application.

2. The method of claim 1 further comprising:
receiving the particular artifact without the at least one cryptographic signature;
performing the one or more verifications of the particular artifact;
generating the at least one cryptographic signature to encode the one or more verifications of the particular artifact; and
associating the at least one cryptographic signature to the particular artifact.

3. The method of claim 1 further comprising:
determining that the at least one dependency specifies that the particular artifact have verified compatibility with a second artifact that runs as part of the application; and
wherein decoding the one or more verifications comprises decoding a particular verification from the at least one cryptographic signature that verifies compatibility between the particular artifact and the second artifact.

4. The method of claim 1 further comprising:
determining that the set of requirements associated with the particular identifier of the particular artifact require that the particular artifact have verified compatibility with a set of resources from one or more nodes selected to run the application; and
wherein decoding the one or more verifications comprises decoding a particular verification from the at least one cryptographic signature that verifies that the particular artifact runs on the set of resources.

5. The method of claim 1 further comprising:
determining that the set of requirements associated with the particular identifier of the particular artifact require that the particular artifact has been verified to originate from a particular source; and
wherein decoding the one or more verifications comprises decoding a particular verification from the at least one cryptographic signature that verifies origination of the particular artifact from the particular source.

6. The method of claim 1 further comprising:
determining that the set of requirements associated with the particular identifier of the particular artifact require that the particular artifact has been verified to not contain a set of security vulnerabilities; and
wherein decoding the one or more verifications comprises decoding a particular verification from the at least one cryptographic signature that verifies that the particular artifact does not contain the set of security vulnerabilities.

7. The method of claim 1 further comprising:
selecting the particular artifact from a plurality of artifacts that provide different versions of a particular set of functionality for the application;
determining that the set of requirements associated with the particular identifier of the particular artifact require that a specific version of the particular set of functionality be included as part of the application; and
wherein decoding the one or more verifications comprises decoding a particular verification from the at least one cryptographic signature that verifies that the particular artifact contains the specific version of the particular set of functionality.

8. The method of claim 1,
wherein decoding the one or more verifications comprises decoding a particular verification from the at least one cryptographic signature that verifies that the particular artifact satisfies the particular dependency with one or more other artifacts of the application.

9. The method of claim 1 further comprising:
receiving the set of requirements associated with each of the set of identifiers in a Helm chart or a definition file associated with the application.

10. The method of claim 1 further comprising:
determining that the particular artifact comprises at least two containers providing different functionality for the application;
verifying a first container of the at least two containers based on a first verification decoded from a first cryptographic signature of the at least one cryptographic signature that is associated with the first container; and
verifying a second container of the at least two containers based on a second verification decoded from a second cryptographic signature of the at least one cryptographic signature that is associated with the second container.

11. The method of claim 1 further comprising:
verifying a first requirement of the set of requirements associated with the particular identifier of the particular artifact based on a first verification decoded from a first cryptographic signature of the at least one cryptographic signature; and
verifying a second requirement of the set of requirements associated with the particular identifier of the particular artifact based on a second verification decoded from a second cryptographic signature of the at least one cryptographic signature.

12. The method of claim 1 further comprising:
decoding a set of executable functions used in implementing the application and the one or more verifications from the at least one cryptographic signature.

13. The method of claim 1, wherein the particular artifact comprises one or more of a container, an image, a virtual machine, a Helm chart, a Yet Another Markup Language ("YAML") file, a configuration file, a manifest file, a script, an executable file or package, and code.

14. The method of claim 1 further comprising:
selecting a second artifact comprising one or more cryptographic signatures to provide a first set of functionality for the application that is different than a second set of functionality provided by the particular artifact;
determining that one or more verifications decoded from the one or more cryptographic signatures of the second artifact do not satisfy the set of requirements associated with an identifier of the second artifact; and
replacing the second artifact with a third artifact that provides the first set of functionality for the application in response to determining that the one or more verifications decoded from the one or more cryptographic signatures of the second artifact do not satisfy the set of requirements associated with the identifier of the second artifact.

15. The method of claim 14 further comprising:
deploying the third artifact to run as part of the application on a same set of resources as the particular artifact in response to one or more verifications associated with at least one cryptographic signature of the third artifact satisfying the set of requirements associated with an identifier of the third artifact.

16. The method of claim 1 further comprising:
receiving a second artifact comprising one or more cryptographic signatures prior to receiving the particular artifact, wherein the second artifact implements a same set of functionality for the application as the particular artifact;

determining that the one or more cryptographic signatures of the second artifact do not originate from or do not identify a trusted source;

discarding the second artifact; and wherein deploying the particular artifact comprises verifying that the at least one cryptographic signature of the particular artifact originates from or identifies the trusted source.

17. The method of claim 1 further comprising:

executing the application based on the particular artifact and other artifacts from the set of artifacts satisfying the at least one dependency and the set of requirements associated with each artifact of the other artifacts, and wherein executing the application comprises running the particular artifact and the other artifacts concurrently on one or more shared nodes.

18. A system comprising:

one or more processors configured to:

receive a request to deploy an application that is defined with a set of artifacts;

receive a particular artifact that comprises at least one cryptographic signature and functionality that is defined as part of the application and other applications;

decode one or more verifications of the particular artifact from the at least one cryptographic signature;

select an admission control list from a plurality of admission control lists based on the request to deploy the application, wherein the admission control list comprises a set of identifiers that identify the set of artifacts forming the application, at least one dependency that the particular artifact have with another artifact of the set of artifacts that runs as part of the application, and a set of requirements associated with each identifier of the set of identifiers; and deploy the particular artifact to provide the functionality for the application in response to an identifier of the particular artifact matching a particular identifier from the set of identifiers of the admission control list, and the one or more verifications that are decoded from the at least one cryptographic signature of the particular artifact satisfying the at least one dependency and the set of requirements associated with the particular identifier in the admission control list of the application.

19. A non-transitory computer-readable medium, storing a plurality of processor-executable instructions to:

receive a request to deploy an application that is defined with a set of artifacts;

receive a particular artifact that comprises at least one cryptographic signature and functionality that is defined as part of the application and other applications;

decode one or more verifications of the particular artifact from the at least one cryptographic signature;

select an admission control list from a plurality of admission control lists based on the request to deploy the application, wherein the admission control list comprises a set of identifiers that identify the set of artifacts forming the application, at least one dependency that the particular artifact have with another artifact of the set of artifacts that runs as part of the application, and a set of requirements associated with each identifier of the set of identifiers; and deploy the particular artifact to provide the functionality for the application in response to an identifier of the particular artifact matching a particular identifier from the set of identifiers of the admission control list, and the one or more verifications that are decoded from the at least one cryptographic signature of the particular artifact satisfying the at least one dependency and the set of requirements associated with the particular identifier in the admission control list of the application.

* * * * *